United States Patent

Inamura

[11] Patent Number: 5,269,541
[45] Date of Patent: Dec. 14, 1993

[54] METAL GASKET WITH SEALING DEVICE WITH DIFFERENT SPRING CONSTANT

[75] Inventor: Susumu Inamura, Tokyo, Japan
[73] Assignee: Ishikawa Gasket Co., Ltd., Tokyo, Japan
[21] Appl. No.: 647,028
[22] Filed: Jan. 28, 1991
[30] Foreign Application Priority Data
　Feb. 1, 1990 [JP] Japan .................................. 2-8161
[51] Int. Cl.⁵ .............................................. F16J 15/08
[52] U.S. Cl. .............................. 277/235 B; 277/234; 277/236
[58] Field of Search ................ 277/207 R, 208, 209, 277/233, 234, 235 B, 235 R, 236

[56] References Cited

U.S. PATENT DOCUMENTS

| | | | |
|---|---|---|---|
| 4,203,608 | 5/1980 | Nicholson | 277/235 B |
| 4,272,085 | 6/1981 | Fujikawa et al. | 277/235 B |
| 4,480,844 | 11/1984 | Kozerski | 277/235 B |
| 4,721,315 | 1/1988 | Ueta | 277/235 B |
| 4,728,110 | 3/1988 | Nakasone | 277/235 B |
| 4,759,556 | 7/1988 | Udagawa | 277/235 B |
| 4,799,695 | 1/1989 | Yoshino | 277/234 X |
| 4,915,398 | 4/1990 | Kitagawa | 277/235 B X |
| 4,948,153 | 8/1990 | Takahashi et al. | 277/235 B |
| 4,968,045 | 11/1990 | Abe et al. | 277/234 X |
| 4,971,338 | 11/1990 | Udagawa | 277/235 B |

FOREIGN PATENT DOCUMENTS

| | | | |
|---|---|---|---|
| 0124659 | 2/1979 | Japan | 277/235 B |
| 0229037 | 12/1984 | Japan | 277/235 B |
| 0103668 | 7/1986 | Japan | 277/235 B |
| 0255250 | 11/1986 | Japan | 277/235 B |
| 2209807 | 5/1989 | United Kingdom | 277/235 B |

OTHER PUBLICATIONS

Cherry Steel Laminate Gasket Technical Report, Ishikawa Gasket Company, 1979.

*Primary Examiner*—William A. Cuchlinski, Jr.
*Assistant Examiner*—James K. Folker
*Attorney, Agent, or Firm*—Kanesaka and Takeuchi

[57] ABSTRACT

A gasket of the invention is installed between two engine parts of an internal combustion engine. The gasket may be formed of one metal plate including at least one first hole, at least one sealing device formed around the first hole, and a plurality of bolt holes for attaching the gasket to the engine. The metal plate further includes at least one second hole situated adjacent to the first hole between the two bolt holes, and a bead around the second hole. The second hole is arranged such that a substantial portion of the second hole is located outside an imaginary line linking between centers of the two bolt holes adjacent to each other. The bead includes an inner section near the first hole having spring constant weaker than a remainder of the bead. Therefore, when the metal plate is tightened between the engine parts, the bead can be compressed equally to securely seal around the second hole. The metal plate may be combined with other metal plates to constitute a steel laminate gasket.

10 Claims, 2 Drawing Sheets

METAL GASKET WITH SEALING DEVICE WITH DIFFERENT SPRING CONSTANT

BACKGROUND OF THE INVENTION AND RELATED ART STATEMENT

The present invention relates to a metal gasket having a sealing device with different spring constants. In particular, the spring constant of a sealing device, such as a bead, for sealing around a fluid hole of an engine is partly changed to securely seal around the fluid hole.

In a metal gasket, such as a steel laminate gasket for a cylinder head, cylinder bores, water holes, oil holes and so on are sealed by beads and/or other sealing devices. Especially, since the metal is durable and can be processed easily, the holes are liable to be sealed by only metal processing, i.e. bending the metal to form beads and so on.

In the cylinder head gasket, high pressure and temperature are applied to the cylinder bores, so that the area around the cylinder bore is liable to leak. Therefore, bolts for attaching the gasket to the cylinder head and cylinder block are arranged to effectively seal around the cylinder bores to prevent leakage therefrom.

The cylinder head gasket includes the water holes, oil holes and so on as well as the cylinder bores. Although sealing pressure is effectively applied to the cylinder bores, sealing pressure is not equally applied to other holes due to location of the hole. Therefore, it is difficult to effectively seal around all the holes, such as the water holes and oil holes. In long usage, sealing ability decreases to cause leakage from these holes.

In order to compensate unequal sealing pressure by tightening of bolts, it was proposed to form an auxiliary bead at a portion where tightening pressure is low, as disclosed in U.S. Pat. No. 4,759,556. Namely, main and auxiliary beads provide high spring constant at a low tightening pressure portion.

In Japanese Patent Publication (KOKAI) No. 62-261755, the width of a bead is changed such that a center between the bolts becomes narrow. As a result, spring constant in the center portion between the bolts becomes high.

In Japanese Utility Model Publication (KOKAI) No. 60-177371, a bolt hole is surrounded by an outer bead with different spring constant. Namely, an inner portion of the bead around the bolt hole is stronger than an outer portion of the bead around the bolt hole, while the bead between the two bolt holes is the strongest.

The prior art patents disclosed that spring constant of one bead is changed to provide high spring constant at a low tightening pressure portion. However, there is no disclosure for sealing around a fluid hole adjacent the cylinder hole.

Accordingly, one object of the present invention is to provide a metal gasket, which can securely seal around a fluid hole adjacent a cylinder hole of the engine.

Another object of the invention is to provide a metal gasket as stated above, which can equally provide sealing pressure around the fluid hole of the engine.

A further object of the invention is to provide a metal gasket as stated above, which can be manufactured easily and economically.

Further objects and advantages of the invention will be apparent from the following description of the invention.

SUMMARY OF THE INVENTION

In accordance with the present invention, a gasket is formed of at least one metal plate and is installed between two engine parts by means of bolts. The gasket or metal plate includes at least one first hole, at least one sealing device, i.e. a bead, formed around the first hole to seal around the first hole, and a plurality of bolt holes formed outside the first hole. The bolts pass through the bolt holes and tighten the engine parts together with the gasket.

The gasket further includes at least one second hole situated adjacent to the first hole and a bead formed around the second hole to seal therearound. The second hole is situated between the two bolt holes to be tightened substantially equally by the two bolts and is arranged such that a substantial portion of the second hole is located outside an imaginary line linking between centers of the two bolt holes adjacent to each other. The imaginary line extends along the outer portion of the metal plate.

The bead includes an inner section near the first hole, which has spring constant weaker than a remainder of the bead. Namely, an outer section of the bead facing an outside of the gasket is stronger than the inner section in spring constant. Accordingly, when the metal plate is tightened between the two engine parts, the bead can be compressed equally to securely seal around the second hole.

When the metal plate as stated above is assembled with another metal plate, the gasket constitutes a steel laminate gasket. In case another metal plate is assembled, that metal plate must be located at a side where the sealing device and the bead project. The gasket may be further assembled with other metal plates.

The spring constant of the bead may gradually increase as the distance from the inner section of the bead increases. The spring constant may be changed by changing width, height or projecting angle of the bead.

DETAILED DESCRIPTION OF THE PREFERRED EMBODIMENTS

Figure 1:
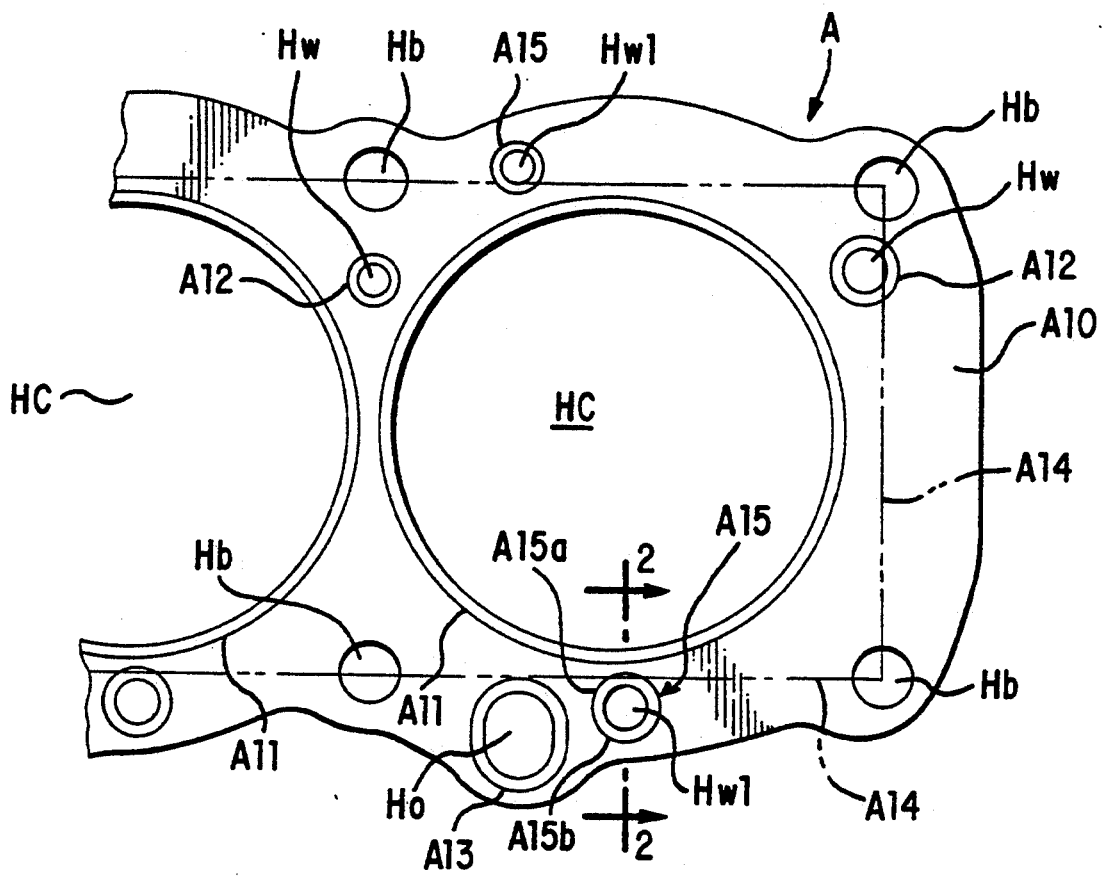
FIG. 1 is a partial plan view of a first embodiment of a metal gasket of the invention.
Figure 2:
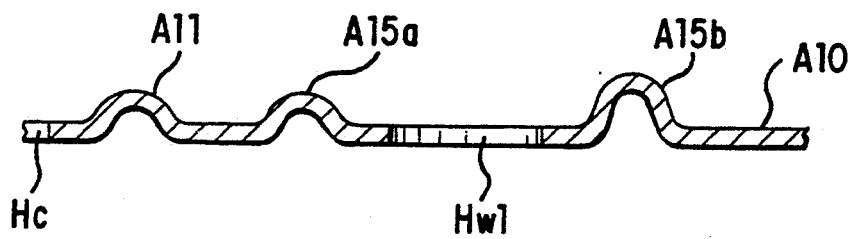
FIG. 2 is an enlarged section view taken along a line 2—2 in FIG. 1.

Referring to FIGS. 1 and 2, a first embodiment A of a metal gasket of the invention is shown. The gasket A is a cylinder head gasket and is formed of one metal plate A10.

The metal gasket A includes a plurality of cylinder bores Hc, water holes Hw and Hw1, oil holes Ho and bolt holes Hb, as in the conventional gasket. The bolt holes Hb are arranged outside the cylinder bores Hc to apply tightening pressure around the cylinder bores Hc as equally as possible.

Beads A11 are formed around the cylinder bores Hc to seal therearound when the gasket is tightened. In the gasket A, however, any other sealing device may be used instead of the beads A11. Also, beads A12 and A13 are formed around the water holes Hw and oil holes Ho respectively to seal around these holes.

As shown in FIG. 1, the water holes Hw1 are located between the bolt holes Hb and are arranged such that the substantial portion thereof is located outside imaginary lines A14 linking between centers of the bolt holes Hb along an outer portion of the gasket. Namely, all the cylinder bores Hc are located inside the imaginary lines A14. Also, more than half of the water hole Hw1 is located outside the imaginary line A14. Moreover, the water hole Hw1 is located between the bolt holes not to be affected excessively by one of the two bolts.

In the present invention, around the specific water holes Hw1 as explained above, specific beads A15 are formed to securely seal therearound.

The bead A15 is formed of an inner portion A15a facing or near the cylinder bore Hc and an outer portion A15b facing outwardly of the gasket A or away from the cylinder bore Hc. As clearly shown in FIG. 2, the inner portion A15a has a height substantially the same as a height of the bead A11, while the outer portion A15b has a height higher than the inner portion A15a. The height of the inner portion A15a gradually increases toward the outer portion A15b.

Since the height of the outer portion A15b is higher than that of the inner portion A15a, when the metal plate A10 is tightened between a cylinder head and a cylinder block (both not shown), the outer portion A15b can provide sealing or surface pressure stronger than the inner portion A15a.

The outer portion A15b is located away from the bolt holes Hb and the cylinder bore Hc. Therefore, when the metal plate A10 is tightened, the lowest tightening pressure among the bead A15 is generally applied to the outer portion A15b.

In order to compensate the tightening pressure in the bead A15 as stated above, the height of the bead A15 is made high at the outer portion A15b in the bead A15 so that high spring constant is obtained thereat.

Further, when the cylinder head is tightened against the cylinder block, an outer periphery of the cylinder head outside the bolts is likely to turn upwardly due to counter force caused by tightening force applied to the bolts. Also, when the engine is actuated, the outer portion of the engine vibrates excessively. In the present invention, spring constant at the outer portion A15b of the bead A15 is high, so that the outer portion A15b can be securely sealed even against the vibration of the engine and the movement of the outer periphery of the cylinder head.

When the spring constant is changed, the height of the bead may be changed as stated above. Also, a width or a projecting angle of the bead may be changed to change the spring constant. Generally, spring constant can be made strong in case a height is made high, a width is made short and a projecting angle of a bead is made close to a vertical line.

Figure 3:
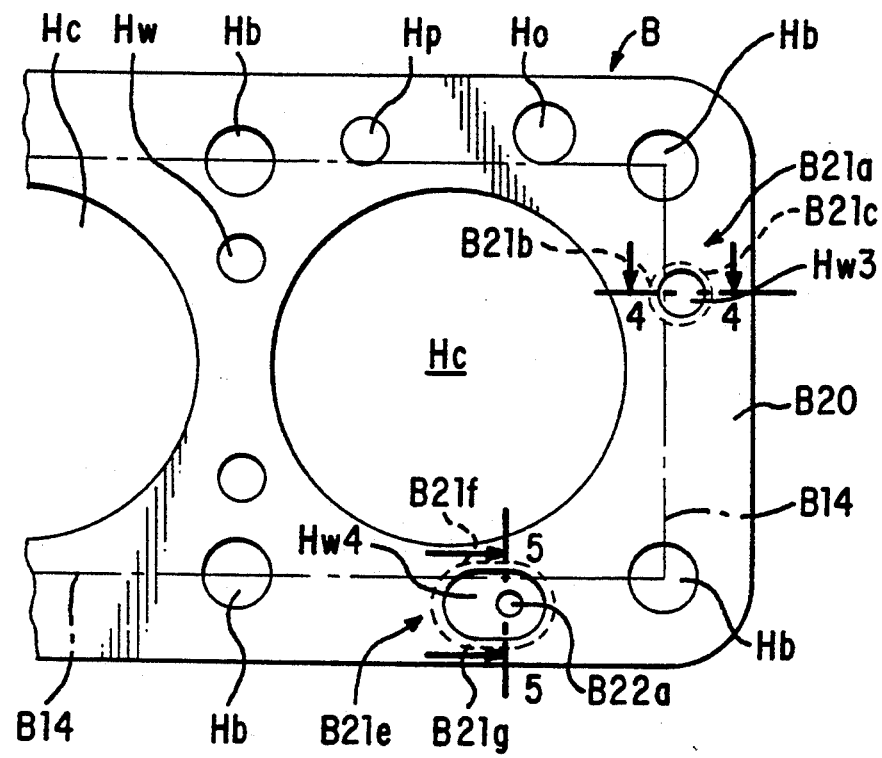
FIG. 3 is a partial plan view of a second embodiment of a metal gasket of the invention.
Figure 4:
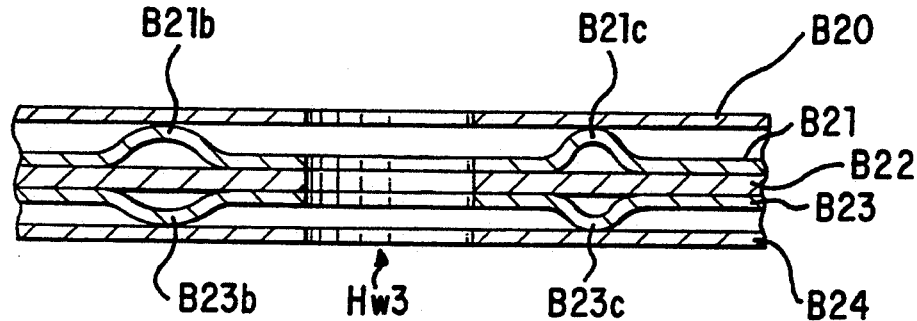
FIG. 4 is an enlarged section view taken along a line 4—4 in FIG. 3.
Figure 5:
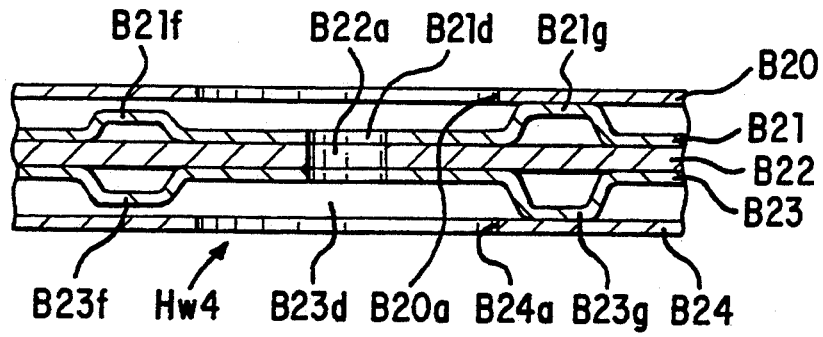
FIG. 5 is an enlarged section view taken along a line 5—5 in FIG. 3.

FIGS. 3-5 show a second embodiment B of the metal gasket of the present invention. The gasket B is a cylinder head gasket formed of a plurality of metal or steel plates, i.e. steel laminate gasket.

The gasket B includes water holes Hw3, Hw4 as well as cylinder bores Hc, water holes Hw, oil hole Ho, push rod hole Hp and bolt holes Hb. The water holes Hw3, Hw4 are located between the bolt holes Hb, and are substantially situated outside imaginary lines B14 linking between centers of the bolt holes Hb.

The gasket B is formed of an upper plate B20, middle plates B21, B22, B23 and a lower plate B24. The upper and lower plates B20, B24 are plain plates, and the middle plates B21, B23 are the same plates arranged symmetrically to the middle plate B22. The middle plates B21, B23 substantially correspond to the plate A10 as explained before.

As shown in FIG. 4, the middle plate B21 is provided around the water hole Hw3 with a bead B21a having an inner portion B21b located near the cylinder bore Hc and an outer portion B21c located away from the cylinder bore Hc. The width of the inner portion B21b is wider than that of the outer portion B21c, so that the inner portion B21b has spring constant less than that of the outer portion B21c.

Also, the middle plate B23 is provided around the water hole Hw3 with a bead B23a having an inner portion B23b located near the cylinder bore Hc and an outer portion B23c located away from the cylinder bore Hc. The width of the inner portion B23b is wider than that of the outer portion B21c to provide spring constant less that the outer portion B23c.

As shown in FIG. 5, the middle plates B21, B23 are provided with different beads around the water hole Hw4. Also, flow rate of water passing through the water hole Hw4 is restricted by the middle plates B21, B22, B23.

In particular, the upper plate B20 includes a hole B20a, and the lower plate B24 includes a hole B24a. The holes B20a, B24a correspond to the size of the water hole Hw4. The middle plate B22 includes a hole B22a smaller than the holes B20a, B24a.

The middle plate B21 includes a hole B21d corresponding to the hole B22a and a bead B21e having an inner portion B21f located near the cylinder bore Hc and an outer portion B21g located away from the cylinder bore Hc. The middle plate B23 includes a hole B23d corresponding to the hole B21d and a bead B23e having an inner portion B23f located near the cylinder bore Hc and an outer portion B23g located away from the cylinder bore Hc.

The height of the outer portions B21g, B23g is higher than that of the inner portions B21f, B23f, respectively. Therefore, the outer portions B21g, B23g is higher than the inner portions in spring constant.

Also, the beads B21f, B21g, B23f, B23g have flat top portions. As a result, when the beads are tightened, tightening pressure is not concentrated at one portion and is substantially spread over the entire flat top portions. Therefore, the gasket can seal around the water holes Hw4 at moderate sealing pressure.

In the steel laminate gasket B, when the gasket B is situated between a cylinder head and a cylinder block (both not shown) and is tightened, the beads B21b, B21c, B23b, B23c, B21f, B21g, B23f, B23g are compressed. The beads B21b, B21c, B23b, B23c seal around the water hole Hw3, while the beads B21f, B21g, B23f, B23g seal around the water hole Hw4.

In the respective water holes Hw3, Hw4, the outer portions have spring constant higher than the inner portions, so that the outer portions are tightened strongly, as in the gasket A. In the gasket B, since the middle plates B21, B23 have beads for sealing around the water holes Hw3, Hw4, strong sealing pressure is obtained around the water holes Hw3, Hw4. The gasket B substantially operates as in the gasket A. However, the gasket B can provide strong sealing pressure around the water holes.

While the invention has been explained with reference to the specific embodiments of the invention, the explanation is illustrative and the invention is limited only by the appended claims.

What is claimed is:

1. A metal plate for a gasket adapted to be installed between two engine parts of an internal combustion engine and fastened by means of bolts, comprising, at least one first hole situated inside the metal plate, said first hole communicating with a cylinder bore of the engine, at least one sealing device formed around the first hole so that when the metal plate is tightened between the engine parts, the sealing device seals around the first hole, a plurality of bolt holes formed outside the first hole, said bolts passing through the bolt holes and tightening the engine parts together, at least one second hole situated adjacent to the first hole and located between two bolt holes, said second hole being arranged such that a substantial portion of the second hole is located at a side away from the first hole relative to an imaginary line linking between centers of two bolt holes adjacent to each other, said imaginary line extending along an outer portion of the metal plate and forming a closed loop, and a bead formed around the second hole and having an inner section near the first hole and an outer section away from the inner section and the first hole, said inner section of the bead having spring constant lower than spring constant of the bead at the outer section so that when the metal plate is tightened between the engine parts, the bead can be compressed substantially equally throughout the entire bead regardless pressure applied thereto to securely seal around the second hole.

2. A metal plate according to claim 1, wherein said spring constant of the bead gradually increases a distance from the inner section increases.

3. A metal plate according to claim 2, wherein said spring constant is changed by varying at least one dimension selected from the group consisting of width, height and projecting angle of the bead.

4. A steel laminate gasket for an internal combustion engine adapted to be installed between two engine parts and fastened by means of bolts, comprising, a first plate including at least one first hole for communicating with a cylinder bore; at least one sealing device formed around the first hole so that when the gasket is tightened between the two engine parts, the sealing device deforms to seal around the first hole; a plurality of first bolt holes formed outside the first hole, said bolts passing through the first bolt holes and tightening the engine parts together; at least one second hole situated adjacent to the first hole and located between two first bolt holes, said second hole being arranged such that a substantial portion of the second hole is located at a side away from the first hole relative to an imaginary line linking between centers of two first bolt holes adjacent to each other, said imaginary line extending along an outer portion of the first plate and forming a closed loop; and a bead formed around the second hole and having an inner section near the first hole and an outer section away from the inner section and the first hole, said inner section of the bead having spring constant lower than spring constant of the bead at the outer section so that when the gasket is tightened between the engine parts, the bead can be compressed substantially equally throughout the entire bead regardless pressure applied thereto to securely seal around the second hole, and a second plate situated adjacent to the first plate to constitute a steel laminate gasket, said second plate having a third hole corresponding to the first hole for communicating with the cylinder bore, a plurality of second bolt holes corresponding to the first bolt holes, and at least one fourth hole corresponding to the second hole.

5. A steel laminate gasket according to claim 4, wherein said spring constant of the bead gradually increases as a distance from the inner section increases.

6. A steel laminate gasket according to claim 5, wherein said spring constant is changed by varying at least one dimension selected from the group consisting of width, height and projecting angle of the bead.

7. A steel laminate gasket according to claim 4, wherein said bead has a flat top portion so that pressure spreads over the entire flat top portion.

8. A steel laminate gasket according to claim 4, wherein said second and fourth holes are holes for a fluid hole of the engine, said second plate being situated at a side where the sealing device and the bead project.

9. A steel laminate gasket according to claim 8, further comprising a third plate corresponding to the first plate, a fourth plate corresponding to the second plate and a fifth plate situated adjacent to the first plate, said third and fourth plates being arranged symmetrical to the first and second plates so that the fifth plate is located in the center of the gasket.

10. A steel laminate gasket according to claim 9, wherein said first, third and fifth plates partly extend radially inwardly of the holes of the second and fourth plates in order to restrict water flow of the engine.

* * * * *

UNITED STATES PATENT AND TRADEMARK OFFICE
CERTIFICATE OF CORRECTION

PATENT NO. : 5,269,541
DATED : December 14, 1993
INVENTOR(S) : Susumu Inamura It is certified that error appears in the above-identified patent and that said Letters Patent is hereby corrected as shown below:

Column 5, line 39, change "increases a" to -- increases as a --.

Signed and Sealed this

Twenty-sixth Day of April, 1994

Attest:

BRUCE LEHMAN

*Attesting Officer*     *Commissioner of Patents and Trademarks*